United States Patent [19]

Urry

[11] Patent Number: 5,489,493
[45] Date of Patent: Feb. 6, 1996

[54] ALKALINE MANGANESE DIOXIDE CELL

[75] Inventor: Lewis F. Urry, Elyria, Ohio

[73] Assignee: Eveready Battery Company, Inc., Del.

[21] Appl. No.: 473,814

[22] Filed: Jun. 7, 1995

[51] Int. Cl.⁶ .................................................. H01M 4/50
[52] U.S. Cl. ............................................................. 429/224
[58] Field of Search ........................................ 429/224, 59

[56] References Cited

U.S. PATENT DOCUMENTS

| | | | |
|---|---|---|---|
| 3,748,184 | 7/1973 | Witherspoon | 136/122 |
| 4,105,830 | 8/1978 | Kordesch | 429/27 |
| 4,121,018 | 10/1978 | Kocherginsky et al. | 429/27 |
| 4,894,296 | 1/1990 | Borbely et al. | 429/27 |
| 5,079,106 | 1/1992 | Urry | 429/27 |
| 5,277,890 | 1/1994 | Wang et al. | 423/605 |

FOREIGN PATENT DOCUMENTS

| | | | |
|---|---|---|---|
| 0140973 | 7/1983 | European Pat. Off. | H01M 4/90 |
| 2109154 | 10/1982 | United Kingdom . | |

OTHER PUBLICATIONS

Japanese Patent Abstract JP-A-58-32370 Feb. 25, 1983.
Japanese Patent Abstract JP-A-59-86159 May 18, 1984.
Japanese Patent Abstract JP-A-58-157068 Sep. 19, 1983.

*Primary Examiner*—Stephen Kalafut
*Assistant Examiner*—Richard H. Lilley, Jr.
*Attorney, Agent, or Firm*—Robert W. Welsh

[57] ABSTRACT

A hermetically sealed alkaline cell having an anode such as a zinc anode, an aqueous alkaline electrolyte solution and a manganese dioxide cathode in which the cathode is composed of a mixture of a minor amount of highly porous manganese dioxide and a major amount of low porosity manganese dioxide and wherein said mixture provides ion diffusion paths through the cathode.

20 Claims, 1 Drawing Sheet

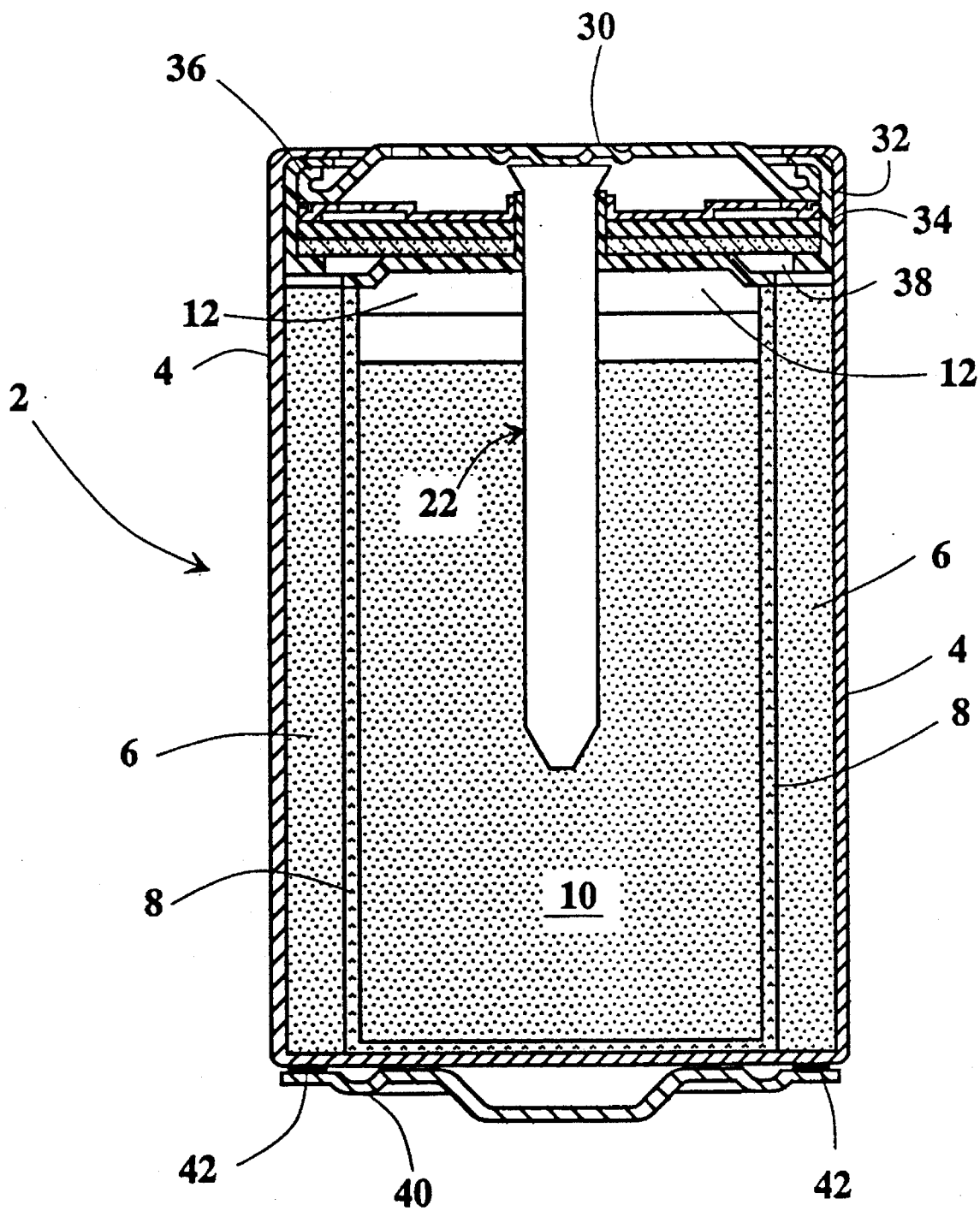

ALKALINE MANGANESE DIOXIDE CELL

FIELD OF THE INVENTION

The invention relates to a hermetically sealed alkaline cell having an anode, an aqueous alkaline electrolyte solution and a cathode comprised of manganese dioxide in which the manganese dioxide is a mixture of high porous manganese dioxide and low porosity manganese dioxide.

BACKGROUND OF THE INVENTION

Alkaline cells are well known in the art and generally employ a zinc anode, a manganese dioxide cathode and an aqueous solution of potassium hydroxide for the electrolyte. These cells are readily available commercially for industrial and home applications. Recently a new type of alkaline cell was disclosed by Cegasa International, a Spanish company, and referred to an air assisted cell. This type of cell employs a zinc anode, manganese dioxide cathode, and aqueous solution of potassium hydroxide as the electrolyte. The cell is designed so that the positive electrode containing the manganese dioxide is exposed to air so that air distribution passages are provided to alloy air from the atmosphere to enter the cell and contact the manganese dioxide. In conventional alkaline cells, the manganese dioxide is shielded from atmosphere (air) through hermetical seal means. The components of the air assisted cell that have been added or modified to permit air to contact the manganese dioxide, occupies space in the cell that could be used for additional active components in a fixed volume size cell. Maximum power output of a cell would require maximum amounts of the active components to be assembled in the cells. In the case of conventional alkaline cells, the manganese dioxide is generally made with a low porosity manganese dioxide material so that the maximum amount of manganese dioxide can be assembled into the cell. In U.S. Pat. No. 5,079,106, an improved air assisted alkaline cell is disclosed in which the cathode for the cell is a mixture of a porous manganese dioxide material and a substantially less porous manganese dioxide material. An experimental alkaline cell was compared with the improved air assisted alkaline cell in this reference and the comparison recited in this patent was that the experimental alkaline cell had better discharge capability on high rat drains since the cathode material present in the assisted alkaline cell had less manganese dioxide than that of the experimental alkaline cell.

U.S. Pat. No. 5,277,890 relates to the manufacture of manganese dioxide by a chemical process. The resulting manganese dioxide product takes the form of particles characterized by filament-like protrusions jutting out from its surface. The manganese dioxide particles having such surface features can be manufactured by reacting manganese sulfate with sodium peroxodisulfate in aqueous solution. The process can be controlled to yield high density manganese dioxide. The manganese dioxide formed in the process can be deposited directly onto the surface of electrolytic manganese dioxide (EMD). The manganese dioxide product is particularly suitable for use as a cathode active material in electrochemical cells.

It is an object of the present invention to provide a sealed alkaline cell that employs a manganese dioxide cathode that is composed of a minor amount of a highly porous manganese dioxide material mixed with a low porosity manganese dioxide material and the cell is provided with seal means to effectively prevent air (oxygen) entering from the atmosphere.

It is an another object of the present invention to provide a sealed alkaline cell that employs a manganese dioxide cathode wherein the manganese dioxide component is composed of a minor amount of chemically synthesized manganese dioxide (CMD) and a major amount of electrolytically deposited manganese dioxide (EMD).

It is another object of the present invention to provide a sealed alkaline cell having a manganese dioxide cathode comprising a highly porous manganese dioxide material and a low porosity manganese dioxide material and wherein the weight percent of the highly porous manganese dioxide material is between 1 wt. % to 35 wt. % of the low porosity manganese dioxide material.

The above and further objects will become apparent upon consideration of the following description and drawing thereof.

SUMMARY OF THE INVENTION

The invention relates to a hermetically sealed alkaline electrochemical cell comprising an anode active material, an aqueous alkaline electrolyte solution, a manganese dioxide cathode and a separator disposed between the anode and cathode and whereby the cathode comprises a mixture of highly porous manganese dioxide having a porosity of between at least 22% and 70% with low porosity manganese dioxide having a porosity of less than 22% and wherein the weight percent of the highly porous manganese dioxide is preferably between 5 weight percent to 35 weight percent of the weight of the low porosity manganese dioxide.

As used herein, "porosity" of manganese dioxide is determined by: first, measuring the manganese dioxide's real density; second, measuring the manganese dioxide's apparent density; third, subtracting the apparent density from the real density thereby obtaining the difference between the two densities; and fourth, dividing this difference by the real density.

As used herein the term "low porosity manganese dioxide" shall mean a manganese dioxide material having a porosity of less than 22% while the term "highly porous manganese dioxide" material shall mean a manganese dioxide material having a porosity of 22% or higher.

In accordance with this invention, a minor amount of the highly porous manganese dioxide material is mixed with a major amount of the low porosity manganese dioxide material to provide a cathode that has ion diffusion paths dispersed through the cathode. This will improve and guarantee diffusion paths through the solid manganese dioxide cathode. It was found that in AA size alkaline manganese dioxide cells, the percent solid packing of cathodes containing a minor amount of highly porous manganese dioxide (hereinafter known as the experimental cells) was reduced abut 2% relative to otherwise identical AA size cells utilizing the same components except that the cathodes contained only low porosity manganese dioxide (hereinafter known as the control cells). Specifically, the control cells had a 73.2 volume percent solid packing in the cathode while the experimental cells had a 71.8 volume percent solid packing in the cathode. The total manganese dioxide input was reduced by 2% for the experimental cells (2.35 ampere hours for the experimental cells versus 2.4 ampere hours for the control cells). The experimental cells outperformed the control cells by 12% (610 minutes versus 540 minutes) on a 1.8 ohm load discharge test in which the cell was discharged for 15 seconds per minute until 0.9 volt cutoff. This 12% increase demonstrated that better ion diffusion through the cathode can be obtained through the use of a minor amount of highly porous manganese dioxide in the cathode. This better ion diffusion through the cathode also can be demonstrated in the short circuit amperage (16.6 amps for the control cells versus 19.1 amps for the experimental cells) and a greater pickup of the electrolyte during the electrolyte soak-up stage of the cell assemblies (1.2 grams for the experimental cells versus 0.99 grams for the control cells). Although the cathode capacity was reduced by using a small percent of the highly porous manganese dioxide material in place of the low porosity manganese dioxide material, the experimental cell showed no signs of running out of water when discharged to a 1.0 volt cutoff.

In accordance with this invention, a minor amount of the highly porous manganese dioxide material is mixed with the low porosity manganese dioxide to form a manganese dioxide electrode. The minor amount of the highly porous manganese dioxide material would be 35% or less of the weight of the low porosity manganese dioxide material and preferably between 1% and 20% of the weight of the low porosity manganese dioxide material and more preferably between 5% and 15% of the weight of the weight of the low porosity manganese dioxide material.

A good source of highly porous manganese dioxide is so-called chemically synthesized manganese dioxide or CMD. CMD is usually marketed with a porosity of 25% to 35%. However, CMD can be prepared in the form of very porous spheres having a porosity of approximately 60%. The porous spheres can be packed so that spaces are provided between the porous spheres thereby providing paths that will effectively improve ion diffusion through the positive electrode. If a cell were prepared using CMD as the only active cathode material then the total energy capacity of the cell would be lowered due to the decrease in the mount of $MnO_2$ available per unit volume of cathode. The porosity of the highly porous manganese dioxide material should be 22% or more, preferably between 25% and 65%, and most preferably between 50% and 60%.

A good source of low porosity solid $MnO_2$ is electrolytically deposited $MnO_2$ or EMD. EMD can be obtained in the form of dense particles after the electrolytically deposited material is stripped from the electrodes, crushed and screened. EMD has a porosity of less than 22% or preferably between 10%–16% and therefore is referred as low porosity manganese dioxide material.

While CMD is a good source of highly porous manganese dioxide, other sources are available now and will be available in the future; therefore, the present invention is not so limited. Likewise, EMD is a readily available source of bulk, low porosity manganese dioxide, however, other sources are available including naturally occurring manganese dioxide, and even conventionally available low porosity CMD, and, therefore, the present invention is not limited to EMD.

The highly porous manganese dioxide and low porosity manganese dioxide are added to a mixer along with a small amount of Teflon, approximately 0.6% by weight of an aqueous solution, which is used to wetproof the cathode and to improve the stability of the formed electrode structure. Teflon is a trademark of Dupont and is used to identify polytetrafluoroethylene polymeric materials. After thoroughly mixing the components, the cathode composition, in one embodiment is poured into a steel container for the cell or in another embodiment, the cathode composition could be preformed into rings that could then be assembled in the cell container. An impact extruder could be used to load the cell container with the cathode material. Under the pressure of the impact extruder, the cathode material becomes tightly packed about the walls of the container, with the Teflon serving to bind the mixture into a compact mass in which the highly porous manganese dioxide material would provide ion diffusion paths through the cathode. It is preferable to have the mixture of the highly porous and low porosity manganese dioxide materials form a homogeneous mixture so that the paths created by the porous material will be substantially dispersed.

Low porosity manganese dioxide can be prepared by starting with manganese ore which is first converted to a nitrate which is then treated with ammonium carbonate and chemical oxidants to form manganese carbonate. The manganese carbonate after washing, is roasted in the presence of oxygen and chemical oxidants to form manganese dioxide which is purified by washing to obtain the battery grade manganese dioxide material. The preferred low porosity manganese dioxide used in the preparation of the cathode of the hermetically sealed alkaline cells of this invention is a material obtained from Sedema which is a division of Sadacam S. A. of Brussels, Belgium. The material is identified by Sedema as Sedema TR manganese dioxide. The material has a porosity of approximately 60%. Conventional low porosity manganese dioxide is obtained from the electrolytic deposition of manganese dioxide and can be purchased from commercial suppliers. When the materials are combined in a homogeneous mixture, and then added to the container to form the cathode, the preferred average porosity for the cathode is 15% to 35% and more preferably 20% to 25%. The amount of the highly porous manganese dioxide material and therefore the paths formed through the cathode can be adjusted to accommodate for a special size cell to provide the optimum performance of the cell under discharge.

The electrochemical cells of the invention can comprise an alkaline electrolyte, a cathode and an anode arranged in a hermetically sealed container in a manner effective to provide electrochemical energy, i.e. when the cell is placed in a circuit, electrochemical energy is provided to the circuit. The cells have terminals of opposite polarity. One terminal is in contact with the cathode and the other is in contact with the anode. The cell is sealed in a manner effective to contain the cell components in the container under conditions of transport and use and prevent the air from entering the cell. The cell construction can include a cupped metallic can, suitably constructed of steel or other metal and can be nickel plated in whole or in part. A tubular cathode containing the active cathode material and conductor, and in some cases, a binder can be lined on the inner surface of the can, and a separator suitably made of a non-woven cellulose or polymer fiber or microporous plastic, or cellophane film can be lined on the inner surface of the tubular cathode. In this construction, the can is in contact with the cathode and thus is the cathodic terminal.

An anode made of a mixture of active anode material, electrolyte, optionally an electrolyte swellable binder such as a polyacrylic acid can be enclosed with the separator. An anode current collector member is inserted into the anode. The cell is closed with a cover and sealed. The cover is in contact with the anode current collector member and is the anodic terminal of the cell. Any conventional seal can be employed. It is desired that the cell construction not have a venting means that would freely vent due to the normal pressure generated in the cell during a normal discharge.

The electrolyte used in this invention is an aqueous alkaline solution, such as potassium hydroxide or sodium hydroxide. The concentration of the solution can be any concentration that provides for ionic conductivity. Typically, in the assembled cell the concentration preferably ranges from about 30% to about 42%.

The cathode used in this invention is a mixture of a highly porous manganese dioxide and low porosity manganese dioxide, as discussed below. In addition to the manganese dioxide, the cathode further comprises a compound that is electrically conductive. This compound is called a conductor and of the many types of known conductors, synthetic or natural graphite, are preferably used in the cells of this invention. Synthetic and natural graphite are readily commercially available. One source is Lonza Std., a Swiss company. The cathode can further comprise a binder. Examples of suitable binders include polytetrafluoroethylene and polyethylene.

The cathodes comprise a major amount of manganese dioxide, a conductive amount of the graphite and often an effective amount of binder. Typically, the manganese dioxide will comprise between about 80 to 85 weight percent of the total cathode weight. When a binder is employed, the binder will comprise less than about 4% by weight. The remainder of the cathode will be comprised of graphite and electrolyte solution. The amount of the electrolyte solution is sufficient to wet the dry components, and to provide a mixture that can be molded. The cathodes are prepared by mixing the components together and dispensing the mix into the container. The mix is then molded or compressed against the inside of the container, or premolded as rings and the rings pressed into the container.

Zinc is used as the active anode material in the cells of the invention. Preferably, the zinc is low gassing zinc, and is in powder form. The powdered zinc is combined with a binder, optional components, and an amount of the electrolyte solution to form a gel. The anode gel generally expands when it is discharged. A suitable zinc alloy would contain zinc and a minimum amount of lead.

The cells of this invention preferably employ additives that inhibit the corrosion of zinc. One beneficial component that can be added to the cell to inhibit the corrosion of zinc is an ethylene oxide polymer and derivatives thereof. Some examples for materials that can be added to the anode would include lead, indium, cadmium, bismuth, thallium, tin, aluminum, and compounds thereof. An indium-containing compound can be added to the anode mix as a zinc corrosion inhibitor. Suitable compounds include indium hydroxide, indium oxide, indium metal and the like.

BRIEF DESCRIPTION OF THE DRAWINGS

The sole drawing is a cross-sectional view of an inverted alkaline cell of the present invention.

DETAILED DESCRIPTION OF THE DRAWINGS

Referring to the drawing, the alkaline cell 2 is assembled in a conventional conductive steel container 4 which also forms an external terminal for the cell. The cathode 6 for cell 2 is a mixture of highly porous manganese dioxide, low porosity manganese dioxide, graphite, electrolyte and sometimes a binder.

After the cathode 6 is formed in the container 4 a separator 8 is added to physically isolate the anode material 10 from the cathode 6 and the container 4 while still permitting ion transport between the electrodes. The use of highly porous manganese dioxide mixed with low porosity manganese dioxide in accordance with the invention enables paths to be formed in the cathode to provide an improvement for ion diffusion through the cathode. The separator 8 could be made of two strips of separator material arranged perpendicular to one another and inserted into the cathode's tubular shaped opening thereby forming a separator basket with a central opening. The anode mix 10 is then added to the separator lined cavity of the cell. An open area 12 is left in the cell to provide room for any expansion of the anode mix 10. An anode current collector 22 is shown as a rectangular slat.

To complete assembly of the cell an external bottom cover 30 is placed into the steel container 4 and is also insulated from contact with the container 4 by the peripheral wall 32 seal member 34. The bottom cover 30 makes electrical contacts with current collector 22, enabling the bottom cover 30 to become the external terminal for cell 2. The edge of the steel container 4 is rolled to hold the upturned portion 36 of the bottom cover 30 locked in position in the bottom of the cell 2. Top cover 40 can be fastened to the container by welds 42 after the cathode is rammed into place. Though the invention has been described with respect to preferred embodiments thereof, many variations and modifications will become apparent to those skilled in the art. It is therefore the intention that the appended claims be interpreted as broadly as possible in view of the prior art including all such variations and modifications.

What is claimed:

1. A hermetically sealed alkaline electrochemical cell comprising an anode active material, an aqueous alkaline electrolyte solution, a manganese dioxide cathode and a separator disposed between the anode and cathode and whereby the cathode comprises a mixture of highly porous manganese dioxide having a porosity of between 22% and 70%, with low porosity manganese dioxide, having a porosity of less than 22% and wherein the weight percent of the highly porous manganese dioxide is between 1 weight percent to 35 weight percent of the weight of the low porosity manganese dioxide.

2. The hermetically sealed alkaline electrochemical cell of claim 1 wherein said highly porous manganese dioxide has a porosity of between 25% and 65%.

3. The hermetically sealed alkaline electrochemical cell of claim 1 wherein said highly porous manganese dioxide has a porosity of between 50% and 60%.

4. The hermetically sealed alkaline electrochemical cell of claim 1 wherein said low porosity manganese dioxide has a porosity of between 10% and 22%.

5. The hermetically sealed alkaline electrochemical cell of claim 4 wherein said low porosity manganese dioxide has a porosity of between 10% and 16%.

6. The hermetically sealed alkaline electrochemical cell of claim 1 wherein the weight percent of the highly porous manganese dioxide is between 5 weight percent to 35 weight percent of the weight of the low porosity manganese dioxide.

7. The hermetically sealed alkaline electrochemical cell of claim 4 wherein the weight percent of the highly porous manganese dioxide is between 5 weight percent to 35 weight percent of the weight of the solid manganese dioxide.

8. The hermetically sealed alkaline electrochemical cell of claim 5 wherein the weight percent of the highly porous manganese dioxide is between 5 weight percent to 35 weight percent of the weight of the low porosity manganese dioxide.

9. The hermetically sealed alkaline electrochemical cell of claim 1 wherein the weight percent of the highly porous manganese dioxide is between 5 weight percent to 20 weight percent of the weight of the low porosity manganese dioxide.

10. The hermetically sealed alkaline electrochemical cell of claim 1 wherein the porosity of the highly porous manganese dioxide is between 25% and 65% wherein the porosity of the low porosity manganese dioxide is between 10% and 22%; and the weight percent of the highly porous manganese dioxide is between 5 weight percent to 35 weight percent of the low porosity manganese dioxide.

11. The hermetically sealed alkaline electrochemical cell of claim 1 wherein the porosity of the cathode is between 15% and 35%.

12. The hermetically sealed alkaline electrochemical cell of claim 10 wherein the porosity of the cathode is between 15% and 35%.

13. The hermetically sealed alkaline electrochemical cell of claim 1 wherein the highly porous manganese dioxide is chemically synthesized manganese dioxide.

14. The hermetically sealed alkaline electrochemical cell of claim 1 wherein the low porosity manganese dioxide is electrolytically deposited manganese dioxide.

15. The hermetically sealed alkaline electrochemical cell of claim 14 wherein the highly porous manganese dioxide is chemically synthesized manganese dioxide.

16. The hermetically sealed alkaline electrochemical cell of claim 13 wherein the porosity of the highly porous manganese dioxide is between 25% and 65%; wherein the porosity of the low porosity manganese dioxide is between 10% and 22%; and the weight percent of the highly porous manganese dioxide is between 1 weight percent to 35 weight percent of the low porosity manganese dioxide.

17. The hermetically sealed alkaline electrochemical cell of claim 14 wherein the porosity of the highly porous manganese dioxide is between 25% and 65%; wherein the porosity of the low porosity manganese dioxide is between 10% and 22%; and the weight percent of the highly porous manganese dioxide is between 1 weight percent to 35 weight percent of the low porosity manganese dioxide.

18. The hermetically sealed alkaline electrochemical cell of claim 15 wherein the porosity of the highly porous manganese dioxide is between 25% and 65%; wherein the porosity of the low porosity manganese dioxide is between 10% and 22%; and the weight percent of the higly porous manganese dioxide is between 1 weight percent to 35 weight percent of the low porosity manganese dioxide.

19. The hermetically sealed alkaline electrochemical cell of claim 1 wherein the alkaline electrolyte is potassium hydroxide.

20. The hermetically sealed alkaline electrochemical cell of claim 1 wherein the anode is a zinc anode.

* * * * *